(12) United States Patent
Aisa

(10) Patent No.: US 6,853,291 B1
(45) Date of Patent: Feb. 8, 2005

(54) SYSTEM DEVICE AND METHOD FOR MONITORING ELECTRIC USERS, PARTICULARLY HOUSEHOLD APPLIANCES

(75) Inventor: Valerio Aisa, Fabriano (IT)

(73) Assignee: Wrap S.p.A., Fabriano (IT)

(*) Notice: Subject to any disclaimer, the term of this patent is extended or adjusted under 35 U.S.C. 154(b) by 0 days.

(21) Appl. No.: 09/622,233

(22) PCT Filed: Feb. 18, 1999

(86) PCT No.: PCT/IB99/00302

§ 371 (c)(1),
(2), (4) Date: Oct. 30, 2000

(87) PCT Pub. No.: WO99/43068

PCT Pub. Date: Aug. 26, 1999

(30) Foreign Application Priority Data

Feb. 20, 1998 (IT) .......................................... TO98A0134

(51) Int. Cl.[7] ................................................ H04Q 1/00
(52) U.S. Cl. ...................................................... 340/3.3
(58) Field of Search ............................. 340/3.3, 825.63, 340/3.51; 62/175; 307/11; 165/238; 709/224

(56) References Cited

U.S. PATENT DOCUMENTS

| | | | |
|---|---|---|---|
| 4,602,340 A | | 7/1986 | Appelberg |
| 4,644,320 A | | 2/1987 | Carr et al. |
| 4,990,908 A | * | 2/1991 | Tung ...................... 340/825.63 |
| 5,207,071 A | * | 5/1993 | Ozu et al. ...................... 62/175 |
| 5,481,140 A | * | 1/1996 | Maruyama et al. ............ 307/11 |
| 5,600,310 A | * | 2/1997 | Whipple et al. ............ 340/3.51 |
| 5,924,486 A | * | 7/1999 | Ehlers et al. ................ 165/238 |
| 6,023,507 A | * | 2/2000 | Wookey ...................... 709/224 |

FOREIGN PATENT DOCUMENTS

| EP | 727668 | 8/1996 |
|---|---|---|
| EP | 727860 | 8/1996 |

* cited by examiner

*Primary Examiner*—Edwin C. Holloway, III
(74) *Attorney, Agent, or Firm*—Cesari and McKenna, LLP

(57) ABSTRACT

A system that includes one or more household appliances that belong to the same household environment and are connected to a network monitors diagnostic and/or statistical information produced by the electronic control systems of the appliances. The electronic control systems provided the diagnostic and/or statistical information to the network and a monitoring device monitors the household appliances by selecting, picking up, organizing and storing the diagnostic and/or statistical information provided to the network by the electronic control systems of the respective appliances. The monitoring device further makes the organized information explicit, that is, available either locally at the appliances or remotely within or outside the household environment. The diagnostic information for a given appliance is representative of the operational efficiency of various electrical and mechanical components of the appliance. The statistical information for the given appliance is representative of the wear status of the various components. The monitoring device may also monitor and make explicit functional information provided to the network by the electronic control systems of the respective appliances.

23 Claims, 1 Drawing Sheet

SYSTEM DEVICE AND METHOD FOR MONITORING ELECTRIC USERS, PARTICULARLY HOUSEHOLD APPLIANCES

BACKGROUND OF THE INVENTION

1. Field of the Invention

The present invention concerns a system, a device and a method thereof for monitoring a plurality of electric users, in particular household appliances connected in a network and belonging to a same household environment.

2. Background Information

As it is known, home automation, i.e. exploiting electronic technology in the household environment, whose aim is to cut down managing costs of the various users and develop new comfort, is getting more and more in use. This is substantially due to the following, reasons:

- an increasing spreading of consumer electronics devices, such as videorecorders, HI-FI systems, satellite receiver systems, safety and theft-safe systems, personal computers, mobile telephones, etc.
- the recent significant developments related to the control systems for household appliances, which are based on the use of microcontrollers and new sensors, and are able to dialog with the external world,
- a progressive affirmation of communication bu standards, i.e. ruling systems defining the procedures for information exchange between the various household users and the physical means such information are transmitted onto.

With reference to the latter point, it is particularly important to know that the communication means establishing itself as a standard in the household environment is the so-called power line, i.e. the power supply network whereto information can be sent in the form of amplitude or frequency modulated small signals. The use of such a means, in fact, allows connection of household users to the network without the need of introducing new or special wiring systems.

As a result, new opportunities based right on the use of the power line are created, which relate to the rationalization themes of energy consumption in the home and improved management of information associated with the various household users, in this frame, several proposals are already known, which are based on the use of control and supervision systems or devices for the household users, all of them characterized in that:

- they perform automatic activity, even if against an appropriate operation by the utilizer or customer for their starting configuration;
- they are classed at a hierarchical higher level compared to the household users level, i.e. developing an active control, with a master role, over them.

A fully alternative solution to such a set "centralized" control and supervision approach of household users is disclosed in the European Patent Application EP-A-0 727 668, filed by the same Applicant hereto.

Such a document described a set of household appliances capable of constantly receiving information concerning the total power absorption of all household users (household appliances, illumination system, air conditioning system, etc.), concerning the maximum usable power (power supply contract), the current time (clock function) and the likely different electricity cost according to variable use hours rates.

Such information are applied by a special external sensor, which may be the same electric meter developed to that purpose, or an alternative device specifically provided. The means whereto such information are flowing may be of different type; however, the power line is a preferable one, i.e. the electric network itself, sine there is no noted for additional wiring.

The set of household appliances described in EP-A-0 727 668, each one equipped with a suitable electronic control system and adequate interfacing means to the network, is able to limit its own electric power consumption "spontaneously" and automatically, so as to maintain the total consumption of the whole household environment constantly below the limit established in the power supply agreement, requiring neither an external centralized supervision system nor any operation by the utilizer.

SUMMARY OF THE INVENTION

From U.S. Pat. No. 4,602,340 a system is know, for distributing coded time or other information signals through the electrical gridwork of a facility such as a home, office, factory, or mobile vehicle, for purposes of information display and/or control and monitoring of equipment and activities thereof.

The present invention is based on the ucknowledgment of the fact that in such a system of "smart" household appliances connected in a network, it would be useful for the utilizer and/or anybody charged with their maintenance to be informed of the operation status of the various household appliances, as well as of their "historical" events.

Therefore, it is the main aim of the present invention to provide a monitoring system allowing the utilizer to verify from one home site or household environment site alone (preferably any site) the operation status of all "smart" appliances connected to the network and capable of communicating with the monitoring system itself.

A further significant aim of the present invention is to provide a monitoring system, which is able to acquire and retain in a non-volatile but updatable memory diagnostic and statistical data generated by each individual "smart" appliance connected in the network and adequately equipped to that purpose.

A further aim of the invention is to provide a monitoring system as described above, which allows transmission of the data stored therein to a proper external location, in order to allow a remote customer service, even a "preventive" one, for the relevant household appliances. Such aims and many others are obtained through a system, a device and a method for monitoring a plurality of electric users, in particular household appliances connected in a network, which belong to one same household environment, as described in the annexed claims which form an integral pant of the present description.

BRIEF DESCRIPTION OF THE DRAWINGS

Further aims, features and advantages of the present invention will become apparent from the following detailed description and the annexed drawing, which are supplied by way of non limiting example, wherein the FIG. 1 shows schematically an embodiment of the system according to the present invention-as viewed in the context of a household environment.

DETAILED DESCRIPTION OF AN ILLUSTRATIVE EMBODIMENT

Figure 1:
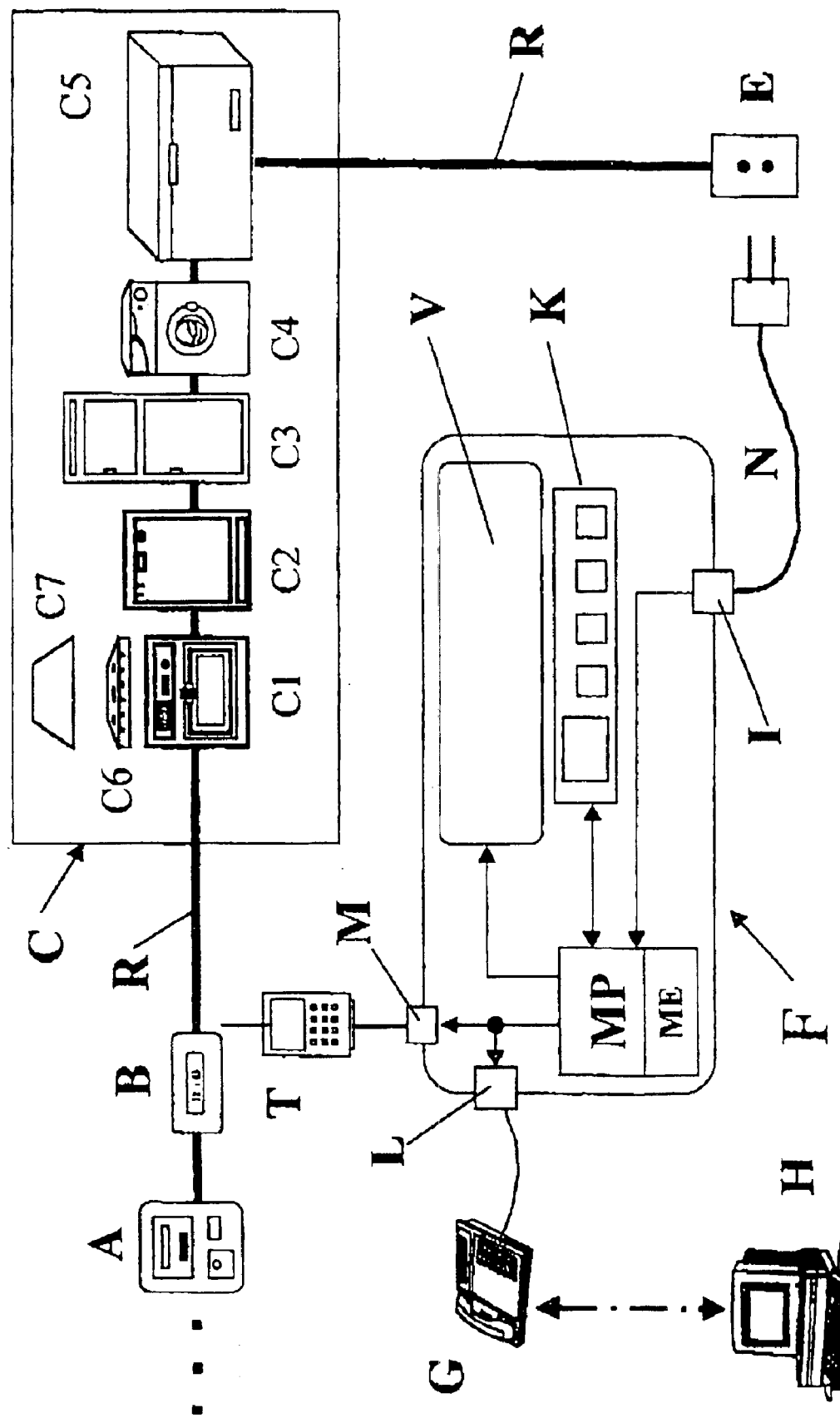

In FIG. 1, reference A indicates a power meter, which may either be a standard type, i e only apt to measure the electric power absorbed in a household environment and indicate the total power consumption, or an advanced type, i.e. comprising a remote managing, system and variable use hours cost rates.

Reference B indicates an auxiliary measuring device, located downstream the power meter A, which is intended to adequately convey various information on the network R of the household environment, eventually including also the information supplied by the power meter itself. The measuring device B may advantageously also perform the function of "screening" the power meter A from the communication signals circulating in the network R of the household environment, through a suitable filter known as such.

The measuring device B, in particular, has suitable means to supply on the network P with those information the power meter A is unable to supply, which are required for the rationalization of the electricity consumption, according to the procedures indicated in the above mentioned patent application EP-A-0 727 668. Such information supplied by the device B vary according to the type of power meter available in the household environment, merely by way of example, the data supplied for the two types of power meters as indicated above, can be as follows:

a) standard power meter:
   value of the power supply contract;
   measure of the current absorbed instant by instant by the set of household users;
   current time;
   likely variable use hours and relevant cost.
b) advanced power meter (with remote management):
   measure of the current absorbed instant by instant by the set of household users;
   current time.

As it can be noticed, the network R also represents the household communication network through which the electric users, duly equipped to that purpose, are able to exchange information, as further detailed in the following.

Reference C indicates as a whole a set of household appliances belonging to the same household environment controlled by the power meter A, each appliance having a suitable interface for its connection to the conveyed-waves network R; in particular C1, C2, C3, C4, CS, C76 and C7 indicate an electric oven, a dishwasher, a refrigerator, a laundry washer, a freezer, a cooking hob and an exhaust hood, respectively.

It will be appreciated that other household users, differing from the ones usually indicated with the term "household appliances", may also belong to the set C, provided they have a special interface for their connection to the conveyed-waves network and their own "smart" control system for a rationalized power consumption as described in EP-A-0 727 668. The elements mentioned so far represent a basic set of integrated household appliances, which are able to rationalize their power consumption according to the procedures already mentioned in the above European patent application (to which reference can be made for further details): the purpose of this is to avoid of exceeding the value of the maximum usable power (power supply contract) and the consequent possible electric black-outs, caused by the switching in of a thermal limiting device, usually provided inside every household power meter.

Reference E indicates a generic standard current socket, through which a device F can receive power supply and consequently information in the form of conveyed waves from the set of household appliances C, or from other users connected to the network R.

Said device F, which is equipped with its own supply cable N for connection to the network R, is provided for the local monitoring and the remote servicing of the household appliances C connected to the network, and represents the main element of the present invention, the device F is preferably equipped with a suitable buffer battery to ensure operation also in case of an electric black-out of the network R.

Reference G indicates a telephone, whose line is apt to be used for the remote transmission to a Bulletin Board Service (BSS) of a center for the customer service or preventive maintenance of the household appliances or users C, said remote customer service and preventive maintenance center is represented schematically by a personal computer indicated with H.

The device F has suitable means to collect various information (through the network R. by means of the cable N) from the household appliances C for their managing their storage on suitable memory means and to express them, or make them explicit, according to various procedures.

Such functions are performed by the device F with means already known per se, such as a conveniently programmed microcontroller MP, which is provided with a suitable conveyed-waves interface I and nonvolatile updatable electronic memory means ME (for example a FLASH or EEPROM memory).

Communication from the users C to the device F, which takes place through the network R, itself, is based, as mentioned above, on the well-known technique of conveyed waves, with FSK modulation (Frequency Shift Keying) or AFK modulation (Amplitude Shift Keying), the flow of information from the various users C to the device F is ruled by suitable standard protocols, which are able to warrant a non-conflictual sharing of the same transmission means R (i.e. the electric network or power line) between the household users C in relationship with the device F and other likely users also available in the same household environment.

As said above, the information that the device F is able to collect, store and make explicit are generated by the household appliances C, which are equipped with adequate control systems to this purpose.

In particular each of said control systems has interfacing means with the communication bus consisting of the network R, and is programmed to send onto said bus, through said interfacing means, information related to the operating conditions of the household appliance. Said information are of various type and for the purposes of the present invention they can be distinguished into functional, diagnostic and statistical information.

Functional information concern the current operating mode of each household user capable of communicating with the device F, where such a mode is expressed through the value of a set of parameters and/or physical quantities characterizing the operation status of each user Merely by way of a non limiting example, in the instance of the refrigerator C3 such functional information may refer to the temperature value selected by the utilizer, the temperature value of the various compartments, the compressor status (ON or OFF), the opening or closing status of the doors, and so on.

Diagnostic information concern the operation quality of each household user capable of communicating, with the device F, i.e. revealing the efficiency status of certain components related to each household user C: such an operation quality is revealed through the value of a set of diagnostic parameters, typical for each user.

Merely by way of a non limiting example, in the instance of the freezer C5 diagnostic information may refer to the number of times the storage temperature has reached less cold values than −18° C., the number of blackouts of the network R, the operation status of the temperature sensors, a likely extended open-door status, the number of switch-in times of the compressor overload-protector, the operation ratio or duty cycle (i.e. ON time of the compressor referred to the total cycle time=ON time+OFF time), etc.

Statistical information concern on the contrary the operation statistical data of every household user capable of communicating with the device F, such operation statistical data practically form the "history" of each user C, from a standpoint of the operations and/or functions performed and from a standpoint of use procedures by the utilizer, thus supplying and reveals on the wear status of both the mechanical and electric components.

Merely by way of a non limiting example, in the instance of the laundry washer C4 statistical information may refer to the total number and/or type of wash cycles selected by the utilizer, the number of washes associated with the different kinds of fabric, the quantity of clothes washed in average for each kind of fabric, the changes made by the utilizer to the temperature value (both to increase and decrease), the changes made by the utilizer to the spin speed value, the water hardness value, the number of rinses performed in average, etc. As mentioned, the above functional, diagnostic and statistical information are generated by the individual household appliances C, which are equipped with suitable sensors already known as such and an advanced control system.

In this frame, it should be appreciated that the microcontroller-based control system of each household appliance C is programmed for the control of all programs and functions which can be performed by the appliance itself, therefore, the control system has a complete knowledge of the appliance operation status and is perfectly able to know, instant by instant, such as in the instance of a refrigerator C3, whether the relevant electric loads (compressor, defrost heater, air circulation fan, lamp in the refrigerating or freezing compartment, etc.) are activated.

Thus, according to the above, it is clear how the control system of each household appliance C is able to generate and send to the device F information of different nature, such as related to the program or function activated by the utilizer, to the advancement step of said program or function, to the instructions inputted by the utilizer, to the timing, associated with activation and deactivation of the individual electric loads, to likely improper behaviours of certain components, etc.

Always in this frame, the device F can be supplied with information obtained through internal sensors of the individual appliances C, such as the water hardness degree from the water network (for example measured by a suitable sensor available in the dishwasher C1), or the type and quantity of clothes being washed (values that the control system of the laundry washer C4 is able to obtain with techniques already known), the room temperature (for example if the refrigerator C3 is equipped with a sensor to measure such a parameter) According to a significant feature of the present invention, further information are also encoded in the nonvolatile memory of each control system of the household appliances C, which refer to the typical consumption features of various electric loads (pumps, solenoid valves, motors, heaters, etc.) of the appliance itself, under their various employment conditions, in other words, the control system of each appliance C is aware of the electric power absorbed by its various associated electric and electronic components: as a result, it is able to calculate, instant by instant, the total power consumption of the household appliance under control.

According to the present invention, the result of such a calculation of the power consumption of each household appliance C (which can be used by the set of individual control systems to rationalize electric power consumption and avoid outweighing the maximum usable or contractual power value) can be used for further purposes.

In particular, such consumption information can be efficiently displayed for the utilizer in the frame of the above functional information (such as in view of an energy saving "consciousness"), or stored in suitable memory means as part of the above statistical and/or diagnostic information.

Moreover, the control system of each household appliance C is programmed according to known techniques to periodically store at least the diagnostic and the functional information in its own memory means, and to update their contents in the time.

Similarly, the microcontroller MN of the device F is programmed to periodically receive through the network R the information generated and/or stored by the control systems of each appliance, in order to store and update them in its own memory means ME. From the above it will be appreciated how the control system of each household appliance C is able to send said functional, diagnostic and statistical information to the device F and how the latter is able to receive them, and/or store them, and/or update them in its own memory ME The microcontroller MP of the device F is also programmed to make explicit through proper means, the information the various appliances C makes available on the network R and/or stored in the memory means ME, with the following modes.

1) at local level, i.e. directly to the utilizer, by means of an adequate display V manufactured according to a known technology (liquid crystals, fluorescent tubes, LED diodes, electroluminescent panels, etc.), whose complexity level is adequate for the quantity and quality of the information to be displayed;

2) at remote level, directed to a customer service and preventive maintenance center H for said plurality of household users C.

In order to allow interaction with the utilizer, the device F also has proper input means, such as a keyboard K, through which it is possible to select the type of information to be displayed at local level (i.e. on the display V of the device F), as well as activate a remote transmission system to the center H.

To allow said remote transmission of the collected information, the device F has inside a standard modem, not shown in the figure, which is connected to the home telephone line through a proper standard connection system, shown schematically with L.

A further instrument to transmit the collected information at the remote level may consist of a telephone, indicated with T in FIG. 1, of the standard cordless type (DECT, or other digital or analog type) or a standard cellular or mobile type (GSM or other digital or analog type), which can be interfaced with the monitoring device F itself through a proper standard connection system M, delivered with the latter.

It should be appreciated that, according to the present invention, the likely transmission of information through the monitoring device F to the remote site H is performed in conformity with the laws in force in the various countries protecting citizens privacy therefore, in other words, such a transmission occurs under the full control of the utilizer, who can decide what type of information has to be sent, the transmission procedure and the relevant frequency.

As to the remote site H, this can be represented as said above by a customer service center for the household users C associated with the device F.

This center is provided to perform a customer service and preventive maintenance activity for the household appliances C, as planned by a proper agreement entered with the utilizer Such a customer service activity is based on the diagnostic data sent by the utilizer to the center through the device F (as said, diagnostic data are generated by the household appliances C, stored in their memory means, transferred periodically to the memory means ME of the device F and then transmitted by the latter to the center H) Preventive maintenance activity, beside said diagnostic data, is also and above all based on the statistical data, which are sent to the service center through the device F (as said, also statistical data are generated by the household appliances C, stored in their memory means, periodically transferred to the memory means ME of the device F, and then transmitted by the latter to the center H).

Concerning the transmission procedure of the information to said customer service and preventive maintenance center, this can be a manual type, i.e. handled directly by the utilizer, or automatic (periodic transmission of information governed by a specific customer service agreement); in both instances, advantageously for the utilizer, information transmission can be made through a toll-free call to a special number of the center itself. From a practical standpoint the device F operates as follows.

Functional information, i e. concerning the current operating procedure of every household appliance C are generated by their own control systems and inputted in the network R for the benefit of the device F (as previously mentioned, transmission of information from the various users C to the device F is controlled by appropriate standard protocols), and the device F, duly programmed for that specific purpose, will make said information explicit on its own display V.

The display modes on the display V may be of various type. For instance, it can be thought of a sequential display of the operation parameters of all active household appliances C, thus, the display V will first show for example the parameters related to the oven C1, followed by the parameters related to the dishwasher C2, then the ones related to the refrigerator C3, and so on.

A further possibility is to provide a display "on request" of the parameters of the appliance C to be monitored from time to time; in this instance, the appliance involved is selected by pressing a special push-button on the keyboard K, and the microcontroller MP will enable the display V to show only the operational parameters of the selected appliance.

In a possible embodiment of the present invention, the control systems of the household appliances C rake available on the network R all functional information they are able to generate, in this frame, the device F has eventually the function of operating as a "filter", for displaying only the information selected by the utilizer through the keyboard K. However, nothing hinders the possibility of programming the device F to "inquire" a specific appliance C with a query placed by the utilizer through the keyboard K.

It is pointed out that the microcontroller MP can favorably be programmed also to draw automatically the attention of the utilizer (for example through a flashing of the display V, or the activation of an acoustic alarm eventually available in the device F), should any of the household appliances C introduce in the network R information related to an improper operating condition (such as jammed impellers in the dishwasher C2, extended open door condition in the refrigerator C3, accidental blow-off of a burner on the hob C6, all conditions detectable by sensing means already known as such).

However, it is clear, that an adequate presetting of the microcontroller MP through programming techniques already known allows implementation of various display possibilities on the display V, and the selection through the keyboard K of the type and complexity level of the functional information to be made available (save that these are generated in an automatic and autonomous way by the control systems of the appliances C) It has also to be remembered that, for the display purposes on the display V, temporary storage of the functional information can be provided, in the memory means ME, if so required.

Diagnostic information, i.e. concerning the operation quality of each household appliance C, are generated, stored and updated with time by the relevant control systems. Such information are then periodically let in the network R always through the control systems of the individual appliances C, for their transfer to a special area of the memory means ME of the device F.

Also transmission of these data from the control system of each appliance C to the microcontroller MP and from the latter to the memory means NE occurs automatically, in the sense that the same control systems of the appliances C are programmed to perform a data transfer at periodic terms (such as for example once a day), either spontaneously or upon request from the device F.

Diagnostic information stored in the memory means Me are then transferred, by means of the telephone G or T, through the microcontroller MP to the service center H.

The microcontroller MP can be programmed to perform such a transmission at remote level in an automatic mode, at periodic terms, and eventually also following, a suitable utilizer's instruction inputted through the keyboard K.

Also statistical information, i.e. the data forming the "history" of each user, based on their operations and/or functions performed as well as on usage procedures by the utilizer, are generated, stored and updated with time by their relevant control systems. As for the instance of diagnostic information, also statistical information are periodically admitted to the network R, to be then transferred to a special memory means ME of the device F. Also the transmission of these data from the control system of each appliance C to the microcontroller MP and from the latter to the memory means ME is automatic in the sense that the control systems of the appliances C are programmed to perform data transfer at periodic terms, either spontaneously or upon request of the device F.

Also in this instance, statistical information stored in the memory means ME are then transferred through the microcontroller MP, by means of the telephone G or T, to the service center H, the microcontroller MP can be programmed to perform such transmission at remote level in an automatic mode, at regular intervals, and eventually following a suitable utilizer's instruction inputted through the keyboard K.

Similarly to the above concerning diagnostic information, transmission of statistical data is performed under the utilizer's full control, in conformity to the laws in force in the various countries protecting citizens' privacy.

As to the physical realization of the monitoring device F, this can freely be either portable or transportable or fixed type.

In the first instance, the device F will be apt to be taken to any place of the home environment where a power socket E is available, i.e. it can be efficiently used by any individuals compelled to remain for longer time in determined areas of the home environment, due to deambulation problems (such as in the instance of an individual with temporary handicap).

In the instance of a fixed device F, it may be associated with a set of users pertaining to a homogeneous context of the home environment, as for instance the kitchen. In this case, the device F can be integrated in the furniture (let us think for instance of the so-called sectional kitchens, i.e. having a modular structure) and represent a typical element of said environment to be adapted to the style of the kitchen itself and relevant trade-mark associated with the supplier of the kitchen furniture.

Thus, the device F can take most variable configurations: either as in-sight monitoring board or hidden inside a cabinet door, as a telephone stand, as a wall clock with an associated display showing the status of the various household appliances C, as a lamp comprised element or other knick-knack, etc.

Back to the typical kitchen environment, the set of the users C may consist of the totality or a part of the following household appliances: gas or electric oven C1 (including the microwave oven), dishwasher C2, refrigerator C3, laundry washer C4, freezer C5, gas or electric hob (including the induction one) C6, exhaust hood C7, electric or gas boiler.

At least some of these appliances can be of the built-in type, i.e. incorporated inside cabinets representing the furniture of the kitchen environment itself. In this specific case, since the appliances are incorporated inside the cabinets, the physical means for the transmission of information to the device F could be, as a possible low-cost alternative for the electric network R itself, a simple duplex telephone cable type, or other cable with two or more wires, characterized by a multi-point serial communication protocol, i.e. wherein a certain number of appliances are connected to the same serial line, each one identified by a well determined address. Such a solution should be considered specific for a modular kitchen and is perfectly compatible with the idea of not requesting the final utilizer for any additional wiring besides the pre existing electric network; in such a case, in fact, a specific wiring for the built-in appliances C would be delivered by the same furniture supplier as an integral optional part of the modular kitchen itself.

As previously mentioned, a further possible function to be associated with the device F is to contribute to the rationalization of the power consumption of the household users according to the solution described in the above European patent application EP-A-0 727 668.

In such an instance, the monitoring device F will be programmed to receive from one source alone, through the sane network R, and display the total absorption of electric power of the whole household environment, as well as the value of the power supply contract, i.e the maximum electric power usable according to said contract.

Such an information source on the total absorption of electric power of the whole household environment and on the value of the power supply agreement can be obtained as said above (and as described in the above patent application EP-A-0 727 668), through a suitable power meter or the appropriate additional measuring device B located downstream the power meter itself.

Eventually, the device F may also be used to make explicit on the display V either automatically or on utilizer's request the information related to the instantaneous consumption of each individual appliance, which the relevant control system is able to calculate as previously described.

The likely function of the device F for the purposes of rationalizing electric consumption is particularly interesting in the instance of a modular kitchen with built-in household appliances C connected to a serial network, as described above.

In such an event, in fact, the device F may be favorably programmed, besides performing its own monitoring functions, to constantly inform the built-in household appliances C of the kitchen environment—provided they are connected through a serial network with electric cable or duplex telephone type cable (if not equipped to dialog directly with the power meter A and/or the measuring device B through the electric network R itself)—of the available value of the residual power, obtained as the difference between the value of the power supply contract and the total power absorbed; in other words, in such an application the device F would be an interface itself between the conveyed-waves network R and the network provided for the built-in household appliances.

On the contrary, the electronic control systems, associated with the monitoring device F, will be so programmed to self-limit the absorption of the electric power of the respective built-in household appliances C based on the value of the residual power and according to appropriate priority criteria (contained in the memory of the control system itself of each individual household appliance), with the aim to ensure that the value of the total power absorbed by the whole borne environment will never exceed the value of the power supply contract.

As a result, the system consisting of the above device F and of the set of built-in household appliances connected through a dedicated network, each one of them equipped with the above appropriate control system, will be able to constantly avoid in a fully automatic mode, the operation of the thermal limiting device associated with the power meter, which switches in anytime the power absorption of the whole home environment exceeds the value of the power supply contract; thus, the utilizer is warranted a new performance of a modular kitchen, represented by the suppression of black-outs due to accidental power overabsorptions and by the consequent saving on the electric bill (since the cost of the absorbed power over the limit value of the power supply agreement will tend to be always higher compared to the cost of the electricity absorbed under normal conditions).

Obviously, such a performance of the device F is not necessarily limited to the instance of a modular kitchen, but can also be provided for all household appliances connected to the network R of a home environment, provided they conform to EP-A-0 727 668 The features of the present invention are clear from the above description.

In particular, a system and a monitoring method have been described, based on the use of a suitable device (F) capable of collecting through a suitable communication network R (preferably consisting of the electric supply network itself) and storing an appropriate nonvolatile electronic memory (ME) both the "functional", "diagnostic" and "statistical" information generated by one or more household users (C), each one of them being equipped with a control system capable of generating such information and supply them adequately through said network (R) to said device (F).

Said device (F) according to the present invention also contains appropriate means (V, L, M) for making explicit such information, at local level directly to the utilizer and/or at remote level to a special service and preventive maintenance center H.

Also the advantages of the present invention are clear from the above description.

According to the invention, the utilizer or anybody in charge of the maintenance of the household appliances has the possibility of being informed of their operating status, wear conditions and "historical" events.

Thus, the utilizer is able to very from one place alone in the home the operating status of all household appliances connected to a same network; equally, information of various kind related to the household appliances may be transmitted to an appropriate external place, so as to allow for an efficient remote servicing, even of a "preventive" type, of the household appliances themselves, or for simplify the local maintenance operation.

Another important advantage of the invention is the provision of an instrument apt to acquire and retain in a nonvolatile memory all diagnostic and statistical data generated day by day by each individual appliance connected to the network, and properly equipped to such purpose, where said data can prove useful for various events (maintenance, repair, suggestion for use, and so on).

It is obvious that many changes are possible for the man skilled in the an to the system, the device and the method for monitoring a plurality of electric users described above by way of example, without departing from the novelty spirit of the inventive idea.

For example, in an especially advantageous embodiment of the invention, the connection of the device F to the system of the appliances C may be of the self-installing type, commonly known with the name of plug & play. i.e. a type where no programming, operation of the system is required, not even during installation.

Another possible variant of the system described above is to provide the connection to the network R of a personal computer, having an appropriate conveyed-waves interface and appropriate software, which allows the utilizer to inquire the device f.

In such an instance, then, the device F would be apt to reveal functional, diagnostic and statistical information at remote level, though always remaining within the home environment, i.e. on the personal computer monitor, as requested from time to time by the utilizer through the above software.

Similarly, if the mentioned personal computer is equipped with its own modem and supported by the above software on issue, it could be used by the utilizer to perform the remote transmission of the diagnostic and statistical information to the outside of the home environment, in this event, the access to the remote site H of the service and preventive maintenance center could also be advantageously possible through Internet.

What is claimed is:

1. Method for monitoring one or more household appliances belonging to a same household environment and connected to a network, wherein at least one of the appliances includes an electronic control system having a microcontroller, memory means and interface means, the method being characterized by the following steps:
the electronic control system for a given appliance
generating diagnostic information that is representative of the efficiency status of components of the household appliance and/or statistical information that is representative of the wear status of components of the household appliance,
storing within said memory means said diagnostic and/or statistical information, and
making the stored diagnostic and/or statistical information available on said network through said interface means; and
a monitoring device that interfaces with said network, the monitoring device
selecting, collecting storing and updating the diagnostic and/or statistical information available on said network from each electronic control systems, and
making said information explicit to a user or to other devices on or outside the network.

2. Method, according to claim 1, wherein said electronic control system updates in time the diagnostic and/or statistical information stored within said memory means.

3. Method, according to claim 1, wherein said diagnostic information relates to the operation quality of the household appliance and components thereof, said operation quality being expressed through the value of a set of diagnostic parameters typical of the use of the household appliance.

4. Method, according to claim 1, wherein said statistical information relates to a history of the use of the household appliance from a viewpoint of the performed operations and/or functions and/or usage procedures of the household appliance.

5. Method, according to claim 1, further including said electronic control system generating, storing and making available on said network functional information that is representative of the current operating status of the household appliance, and
said monitoring device further selecting, collecting, and storing the functional information available on said network from said electronic controls systems, the monitoring device making said functional information explicit to a user or to other devices on or outside the network.

6. Method, according to claim 1, wherein said monitoring device provides for storing and/or updating within its own memory means the diagnostic and/or statistical information collected from said network, before making the information or portions thereof explicit.

7. Method, according to claim 5, wherein said monitoring device provides for storing and/or updating within its own memory means the diagnostic, statistical and/or functional information collected from said network, before making the information or portions thereof explicit.

8. Method, according to claim 1, wherein at least said diagnostic and/or statistical information are made explicit or transmitted outside the household environment.

9. Method, according to claim 8 wherein said diagnostic and/or statistical information are transmitted to a service and/or preventive maintenance center.

10. Method, according to claim 5, wherein the step of selecting is based on the type of information to be made explicit through said monitoring device.

11. Method, according to claim 1, wherein the step of generating the diagnostic and/or statistical information for a given household appliance includes generating the diagnostic and/or statistical information from one or more of an electric oven, a dishwasher, a refrigerator a laundry washer, a freezer, a cooking hob, and an exhaust hood.

12. System for monitoring one or more household appliances belonging to a same household environment and connected to a network, the system including
in at least one of the household appliances an electronic control system that generates and stores at least diagnostic information that is representative of the efficiency status of components of the household appliance and/or statistical information that is representative of the wear status of components of the household appliance, and making the stored diagnostic and/or statistical information available on the network through an interface; and a monitoring device that interfaces with the network, the monitoring device selecting, collecting, storing and updating the diagnostic and/or statistical information available on the network from each electronic control system and making the information explicit to a user or other device on or outside the network.

13. System, according to claim 12, wherein said electronic control system updates in time the stored diagnostic and/or statistical information.

14. System, according to claim 12, wherein said diagnostic information relates to the operation quality of said household appliance, said operation quality being expressed through the value of a set of diagnostic parameters typical of the use of the household appliance.

15. System, according to claim 12, wherein said statistical information relate to a history of the use of the household appliance from a viewpoint of the performed operations and/or functions and/or the usage procedures.

16. System, according to claim 12, wherein said electronic control system also generates functional information that is representative of the current operating status of the household appliance, and said monitoring device selects, collects, stores and updates said functional information and makes said information explicit.

17. System, according to claim 12, wherein said monitoring device includes a memory for storing the diagnostic and/or statistical information transmitted on said network.

18. System, according to claim 17, wherein said monitoring device further includes a display device.

19. System, according to claim 12, wherein said monitoring device includes a transmission means for transmitting said stored information to a remote site.

20. System, according to claim 17, wherein said monitoring device further includes interaction means for selecting the type of diagnostic and/or statistical information to be displayed on said display device.

21. System, according to claim 19, wherein said monitoring device further includes interaction means for activating the transmission of said stored information.

22. System, according to claim 19, wherein said transmission means comprise a modem.

23. System, according to claim 12, wherein the one or more household appliances include one or more of an electric oven, a dishwasher, a refrigerator a laundry washer, a freezer, a cooking hob, and an exhaust hood.

* * * * *